United States Patent Office
3,210,238
Patented Oct. 5, 1965

1

3,210,238
FORMING PAPER INCLUDING WERNER
COMPLEXES AND EPOXY RESINS
Jerome M. Gess, Swarthmore, Pa., assignor to Scott
Paper Company, Philadelphia, Pa., a corporation
of Pennsylvania
No Drawing. Filed Feb. 20, 1963, Ser. No. 260,071
9 Claims. (Cl. 162—164)

This invention pertains to cellulose materials, more specifically, this invention involves cellulose-containing sheet material which has been improved by chemical modifications.

A problem in the chemical modification of the prior art cellulose materials has been the improvement of some cellulose properties without sacrificing others. A particular problem has been the improvement of some cellulose sheet properties, such as, dimensional stability, with little if any improvement in other desired properties, such as, tear strength. The reason for absence of a prior art paper sheet having balanced properties has been probably due to the lack of understanding of the type of cross-linking needed to get the desired results.

The present invention has solved some of the prior art problems by the unexpected discovery and invention of a system of conditions and reactants co-acting to produce a balanced improvement in the cellulose material.

The new discovery and invention is surprising in view of the results obtained.

The proposed theory, which may illustrate the invention, is as follows: The fibers of the cellulose in a sheet material lie in a roughly parallel and generally planar configuration. The novel method supplements the hydrogen bonding or affinity of one parallel strand to the other by bridging the strands chemically with a compound of specific properties. The properly tailored bridge gives flexibility and balance of properties that are represented by the improved characteristics of the sheet.

The above theory is only an explanation of the new properties and it has been founded upon deductions made from the results obtained in the examples. Of course, there may be other theories that can be advanced. It is considered, though, that the theory is of help only in explaining the invention and does not restrict the results. The essential reliance in this case is on improved properties and the new and unexpected results.

The invention is accomplished by a process modifying the cellulose material which comprises the steps of adding a Werner complex selected from a least one member of the group consisting of aluminum Werner complexes and chromium Werner complexes (which are characterized, in a broad, generic, sense by the fact that the complex contains an active hydrogen) to a wet pulp furnish, forming a sheet material from the wet pulp furnish, bringing the Werner complex containing sheet into contact with an epoxy resin emulsion or solvent system and drying the sheet thereby forming the modified cellulose. A diisocyanate having a long chain between the isocyanate moieties can be used in place of the epoxy resin. The steps in the reaction may be inverted; i.e., the epoxy emulsion or solvent system may be added to the sheet after it has been formed and then the sheet may be brought into contact with the Werner complex. The preferred sequence of steps is as first illustrated. A more particular class of the above Werner complexes contains primary amino groups. Each molecule may contain more than one amino group. Two amino groups are equally useful.

The invention is further accomplished by a process of preparing the novel modified cellulose sheet material comprising the steps of:

(a) Adding chromium Werner complexes selected

2 from at least one member of the group consisting of glycinato chromyl chloride, para-amino benzoyl chromyl chloride and lysinato chromyl chloride to the wet pulp furnish, (b) Forming a sheet from the pulp furnish, (c) Taking a high molecular weight epoxy resin with a carbon chain of sufficient length to insure flexibility and adding the epoxy resin to the sheet, and (d) Drying the sheet, thereby forming the modified cellulose.

The aluminum Werner complexes of the above compounds work equally well in the process. The preferred species of the Werner complex, in the above process, is the lysinato chromyl chloride complex and the products obtained therefrom.

The retactants in the process may be described by the following major groups: the pulp starting material, the Werner complexes, the epoxy resins and/or the isocyanates.

The pulp materials used in the invention are those commonly produced on commercial scale from wood cellulose or from other sources of cellulose yielding materials.

The Werner complex is further best described by referring to prior art literature which illustrates sufficient number of classes and types of Werner complexes. Representative references are: E. I. du Pont de Nemours and Company, Inc.'s Product Information Bulletin on chrome complexes and Japanese patents, Nos. 2416/52 and 7313/54, issued July 1, 1952 and November 9, 1954, respectively. The first reference is hereby incorporated in this specification to illustrate the preparation of the complexes. Further, the references are applicable because the listing of the many diverse compounds would render the description of the Werner complexes too extensive.

As it was mentioned before, the general class of useful Werner complexes are those chromium and aluminum complexes having active hydrogens. Illustrative complexes include those which may be characterized by the formula

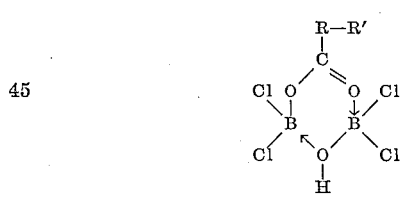

wherein B is selected from the class consisting of Al and Cr; R is selected from the class consisting of an alkylene radical of from 2 to 8 carbon atoms, phenyl radical, and substituted phenyl radical; and R' is selected from the class consisting of

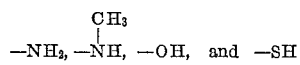

Examples of each group are as follows:

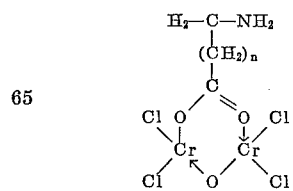

where $n=2-8$

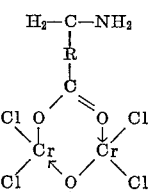

R = phenyl or a substituted phenyl group

The primary amino group, as illustrated by the above compounds, is the preferred active hydrogen containing group.

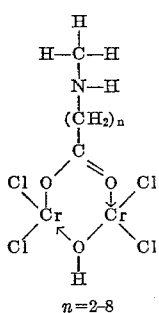

$n = 2-8$

The above group of compounds illustrate a secondary amino radical. The hydrogen is not as active as that of

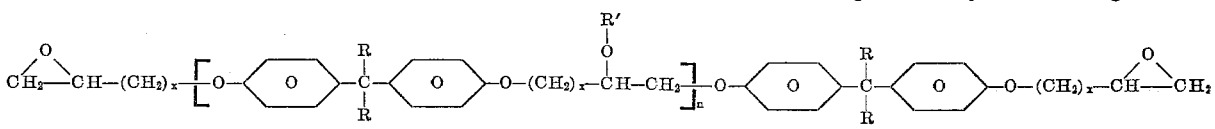

or more specifically

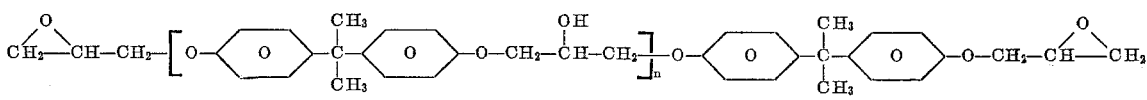

the primary amino group and is, therefore, not as preferred.

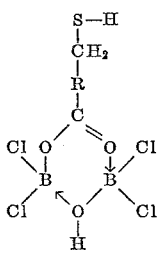

The above group of compounds show the sulfhydryl radical. R can be an alkyl chain, 2–8 methylene (CH₂) units long or it can be a benzyl group. B can be either Al or Cr. Again, this group is not as preferred as the primary amino group. Instead of S, an O may be substituted for a primary hydroxyl group with the same results.

The Cr complex is preferred to the Al complex because it is less sensitive to many of the common pulp and paper chemical additives present in the treated material. The Al complex appears to be slightly more sensitive.

For purposes of illustrating more specifically the present invention, the following primary amine Werner complexes are listed as being of particular interest:

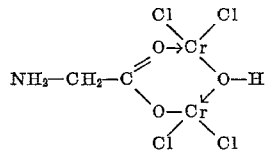

Glycinato chromyl chloride

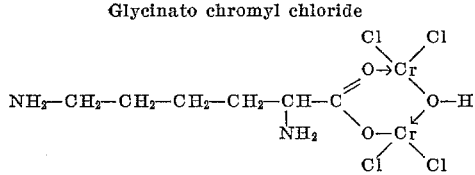

Lysinato chromyl chloride

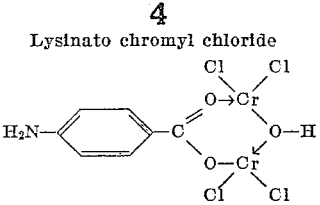

Para-amino benzoyl chromyl chloride

The epoxy resins of interest are generally those that have a sufficiently long molecular distance between the epoxy moieties. A general class of epoxy compounds adaptable in the present process is the class having terminal epoxy moieties sufficiently far apart whereby the rigidity of the short molecule or a more rigid molecule does not detract from the desired and balanced properties.

Other epoxy compounds may be best described by source and include commonly known resins sold under trademarks, such as, the Epon series of resins made by Shell Chemical Corporation. The chemical make-up of these resins can be represented by the following formula:

In the first formula above, R may be alkyl of from 1 to about 5 carbon atoms, R' may be H or alkyl of from 1 to 5 carbon atoms; $x$ may be of from 1 to 4. The number "$n$" is related to the epoxy equivalent and is explained below.

The value of the epoxide equivalent is measured by the grams of resin containing one gram equivalent of epoxide. The value of the epoxide equivalent can vary from 140 to 4000, with the preferred ranges of from 225 to 2000. Doubling the value of epoxy equivalent gives the approximate molecular weight. The particularly interesting sub-range of epoxide equivalents is of from 300 to 1100, while the preferred group of species represents a range of from 450 to 525 epoxide equivalents with a molecular weight of from about 900 to about 1100 and a melting point of from about 64 to about 76° C. Epoxy resins having the following gram equivalent ranges, based on the second formula, are designated as follows:

Resin A contains of from about 225 to about 290 gram equivalents per epoxy group, Resin B contains of from about 300 to about 375 gram equivalents per epoxy group, Resin C contains of from about 450 to about 525 gram equivalents per epoxy group, Resin D contains of from about 870 to about 1025 gram equivalents per epoxy group, Resin E contains of from about 1550 to about 2000 gram equivalents per epoxy group.

Furthermore, any difunctional epoxy compound where the two epoxy groups are sufficiently far apart (for present purposes a distance of from about 5 to about 18 carbon atoms) may be employed. They are represented by the following formula:

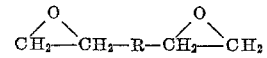

where R is of from 5 to about 24 carbon atoms and may be alkyl, alkenyl, or branched alkyl. The preferred group of epoxy compounds, though, are those represented previously.

In place of the epoxy resin, diisocyanates can be used with the Werner complexes. The diioscyanate consists of an aliphatic diisocyanate having a distance between the two diisocyanate moieties equivalent from about 5 to 18 carbon atoms with the preferred distance of from about 8 to about 12 carbon atoms. Representative diisocyanates are aliphatic diisocyanates of the hydrocarbon series of from about 8 to 18 carbon atoms.

The isocyanates are represented by the formulas:

$$O=C=N-R-N=C=O$$

and $$O=C=N-(CH_2)_n-N=C=O$$

where R is an alkyl either straight chain or branched chain of from 5 to 18 carbon atoms in the main chain. The value of $n$ in the above formula is of from 8 to 18 with the preferred range being 8 to 12.

As it was mentioned above, generally, emulsions of the epoxide are used to practice the invention. Suitable emulsifiers are: Versamid 100, which is obtained from General Mills and is a reaction product of dimerized linoleic acid and a diamine. The product has a high molecular weight (up to 9000 M.W.). Tamol N which is obtained from Rohm & Haas Chemical Company. Emulphor EL–719 is obtained from Antara Chemical Company and is a liquid nonionic polyoxyethylated vegetable oil.

Although solvent systems are more cumbersome to use, in case where epoxide emulsions cannot be formed, solvent systems are employed. Suitable solvent systems are: a 1:1 mixture of methyl ethyl ketone and toluene, or toluene by itself.

Examples of the procedures which illustrates the accomplished invention are given below. Unless otherwise indicated, the components are by weight.

EXAMPLE I

A pulp stock furnish representative of the pulps commonly used in paper industry and referred to as southern kraft pulp was used to prepare hand sheets. The dried pulp had a determined consistency of 86%. Two liters of 3% pulp stock furnish were prepared by adding 70 grams of undried pulp, 22.5 ml. of 2% rosin solution (0.75%), 18 ml. of alum solution (1.5%) and 1900 grams of water. The components were dispersed in a suitable pulp disintegrator, running it for 20 minutes. Hand sheets were made by taking 266 cc. of the suspension per sheet.

EXAMPLE II

Two liters of 3% pulp furnish suspension were made as described in Example I, but twice as much resin rosin (1.5%) and twice as much alum were used (3%). Three untreated sheets were made having weights of 8.78, 9.29 and 9.15 grams.

EXAMPLE III

Three liters of a 3% pulp furnish suspension were made as described in Example II. A number of hand sheets was prepared as follows:

(1) Two untreated sheets weighing 8.1 and 7.6 grams, (2) Three sheets from a pulp furnish suspension treated with 100 ml. of a 3% solution of glycinato chromyl chloride (a chromium Werner complex) weighing 8.1, 8.2 and 8.8 grams, (3) Three sheets from a pulp furnish suspension treated with 100 ml. of a 3% solution of lysinato chromyl chloride and weighing 9.2, 8.5 and 7.8 grams.

Preparation of the above-referred to 3% lysinato chromyl chloride Werner complex was carried out as follows: 200 grams of lysine hydrochloride in 13% isopropyl alcohol and having a 30% chromium content, was neutralized by addition of 52 ml. of a 1:2 solution of concentrated aqueous ammonia in water. The final weight was made to about 867 grams by adding water, and the pH of the solution was adjusted to 6 with aqueous ammonia.

The preparation of the above-referred to 3% solution of glycinato chromyl chloride solution was carried out as follows: To 100 grams of 30% glycinato chromyl chloride, 875 ml. of water was added. The pH of the solution was 2.2 and was raised to 3.2 by adding 25 ml. of an aqueous solution consisting of 16.5% of urea, 5% sodium formate and 0.2% formic acid.

The above hand sheets were treated with the following epoxy resin emulsion prepared as outlined below. Epoxy resin A emulsion was prepared as follows: Into a blender, 120 grams of methyl isobutyl ketone and 180 grams of epoxy resin A were introduced. The components were mixed and an emulsifying agent Emulphor EL–719 (previously described) was added. To this solution was further added 100 ml. of water till the emulsion inverted, then an additional 180 ml. of water was added. The final emulsion was ready for use in preparing the sheets as outlined above.

An emulsion of epoxy resin C was prepared as follows: To 240 grams of resin C (75% solids in 1:1 mixture of methyl ethyl ketone and toluene) were added 60 grams of toluene. Fourteen grams of Tamol N (previously described) dissolved in 269 grams of water were added slowly to resin C in a blender. After the emulsion inverted, 300 grams of water containing 17 grams of clay were added. The emulsion was ready for use as outlined above.

In another embodiment, the epoxy resin was prepared as follows: To 240 grams of resin C (75% solids in 1:1 mixture of methyl ethyl ketone and toluene), 60 grams of toluene were added, the solution was agitated and 21 grams of Emulphor EL–719 was added. Water was introduced slowly into the emulsion till the emulsion inverted. Enough water was used to make a total of 267 grams of the emulsion. Finally, 12 grams of predispersed clay was added, giving a mixture 2% in clay. In place of toluene, methyl isobutyl ketone may be used, or a mixture of methyl isobutyl ketone and toluene.

In a further embodiment, the epoxy resin D was prepared as follows: 210 grams of dry resin D, 200 grams of 1:1 mixture of toluene and methyl isobutyl ketone were introduced into a blender. To the mixed components, 21 grams of an emulsifying agent and 255 grams of water were added. Further, 14 grams of clay were added. The final emulsion contained 30% epoxy resin and 2% of clay. It was ready to be used in the process.

According to the procedure outlined in Examples III anl IV, the following results were obtained:

*Table 1*

[Physical properties of hand sheets made from a typical pulp stock furnish with various wet end additives and various epoxy resins]

| Wet End Additive | Resin | Lbs. Mullen | Elmendorf, Grams | Dry Tensile, Lbs. | Wet Tensile, Lbs. |
|---|---|---|---|---|---|
| Untreated | untreated | 26 | 11 | 12 | 0.4 |
| None | A | 15 | 24 | 6 | 0.2 |
| Do | C | 55 | 34 | 20 | 0.3 |
| Do | D | 100 | 29 | 27 | 0.9 |
| Glycinato complex | A | 16 | 24 | 9 | 2.3 |
| Do | C | 60 | 24 | 22 | 3.0 |
| Do | D | 65 | 20 | 32 | 4.0 |
| Lysinato Complex | A | 47 | 31 | 18 | 4.1 |
| Do | C | 126 | 28 | 35 | 9.7 |
| Do | D | 85 | 27 | 30 | 8.0 |

EXAMPLE IV

Eight tabulating cards of the general type commonly known as IBM cards were dried at 110° C. for ½ hour, cooled and weighed. The cards were soaked for two minutes in 3% glycinato chromyl chloride, run once through a squeezing press, weighed, dried for 5 minutes at 110° C., cooled and reweighed. They were then soaked for 2 minutes in epoxy resin C emulsion prepared according to procedure as in Example III.

The cards were then run through the squeezing press in the form of a sizing press, which can be run hot or cold, dried for 10 minutes at 110° C., cooled and reweighed. Treated with the glycinato compound, the cards added the Werner complex amounting to 0.28 gram per card. Treated with the above-described epoxide, the cards added about 6.68 grams for a total increase in weight of about 6.96 grams per 24.84 grams untreated tabulating card. The cards had a lbs. Mullen of 102, an Elmendorf of 18 grams and a dry tensile strength of 35 lbs. In a similar manner, a paper sheet useful in mapmaking was prepared.

EXAMPLE V

In the same manner, tabulating cards of the type used in Example IV were treated with lysinato chromyl chloride and epoxy resin C. Immersing the cards in lysinato chromyl solution for 5 minutes and following the same procedure as in Example IV, a card picked up about 0.4 of the lysinato complex. Adding the epoxy resin C as described in Example III resulted in a pickup of about 4.3 grams. The total weight of the card was about 30.8 grams. A total of 8 cards were prepared in this manner. The results are summarized below:

*Table II*

[Physical properties of tabulating cards treated as in Example V with the lysinato complex]

| Lbs. Mullen | Elmendorf, Grams | Tensile Strength | |
|---|---|---|---|
| | | Dry, lbs. | Wet, lbs. |
| 105 | 20 | 25 | 5.1 |
| 95 | 18 | 26 | 5.6 |
| 100 | 18 | | |

The cards had a good surface repellency of water, very low absorbency of water, in a hot oven the cards cockled very little and had a very good uniformity of surface coating.

The Mullen test referred to above shows that the cards have improved measurably in their resistance to burst. The test was carried out according to TAPPI–T403M–44 standard.

Lbs. Mullen of 25 indicates satisfactory performance; lbs. Mullen of 50 indicates good performance; and lbs. Mullen of 100 indicates superior performance.

Elmendorf test is a standard test in the paper art and the procedure for carrying it out is given in TAPPI–T414M–49.

An Elmendorf number of 11 grams indicates satisfactory performance; an Elmendorf number of 18 grams indicates good performance; and an Elmendorf number of 25 grams indicates superior performance.

Elmendorf test in general shows the tear resistance of paper stock. It further shows that as the Mullen and tensile strengths increase, the force necessary to tear a sheet will decrease. (Elmendorf tear strength will decrease.) Quite contrary to the previous knowledge, in the present case the tear strength does not decrease.

The tensile strength measurement of the paper is carried out under wet and dry conditions. It indicates the ability of the fibers to bond to each other in a parallel plane. Numbers of 12, 18 and 25 indicate satisfactory, good and superior properties, respectively. The wet strength values of above those values of untreated paper indicate improvement, the significance being in the kind of increase in value. Anything over the previous value, such as, by one number, is significant. Further, the wet tensile number signifies that a chemical cross-linking has occurred supplementing the hydrogen bonding of cellulose.

The tests for these properties were carried out according to TAPPI methods designated for dry tensile as T404 m–50 and wet tensile as T456 m–49.

As seen from the above Tables I and II, the compared results show the actual numbers and improved properties.

What I claim is:

1. A process for producing modified cellulose comprising the steps of:
   (a) adding a Werner complex containing active hydrogen and selected from at least one member of the group consisting of aluminum Werner complexes and chromium Werner complexes to a wet pulp furnish;
   (b) forming a sheet from the wet pulp furnish;
   (c) adding to the Werner complex-containing sheet an epoxy resin emulsion, said epoxy resin having a gram equivalent weight of epoxy of from about 140 to about 4000;
   (d) drying the sheet, thereby forming modified cellulose.

2. A process for producing modified cellulose comprising the steps of:
   (a) adding to a wet pulp furnish a Werner complex containing an active hydrogen and selected from at least one member of the group consisting of aluminum Werner complexes and chromium Werner complexes of the formula

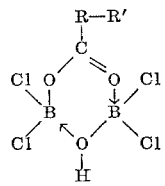

wherein B is selected from the class consisting of Al and Cr; R is selected from the class consisting of an alkylene radical of from 2 to 8 carbon atoms, phenyl radical, and substituted phenyl radical; and R' is selected from the class consisting of

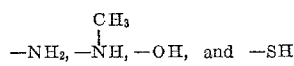

(b) forming a sheet from the wet pulp furnish;
   (c) adding an epoxy resin emulsion to the formed wet sheet wherein the epoxy resin is characterized by the formula:

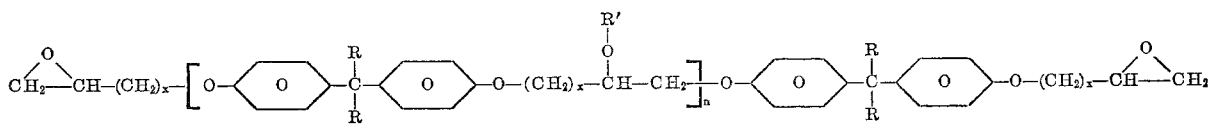

wherein R is selected from the class consisting of alkyl from 1 to 5 carbon atoms, R' is alkyl radicals of from 1 to 5 carbon atoms and hydrogen, x is from 1 to 4, and wherein n represents the number of grams containing 1 gram equivalent of epoxy and wherein the gram equivalents of epoxy are of from 140 to 4000, and (d) drying the wet sheet, thereby forming the modified cellulose.

3. A process for preparing modified cellulose comprising the steps of:
   (a) adding chromium Werner complex selected from

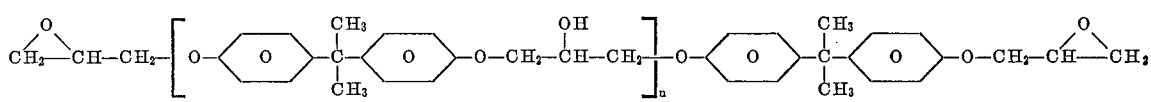

at least one member of the group consisting of glycinato chromyl chloride, p-amino benzoyl chromyl chloride, and lysinato chromyl chloride to a wet pulp furnish;
   (b) forming a sheet from the pulp furnish;
   (c) adding an epoxy resin having a gram equivalent weight of epoxy of from about 140 to about 4000; and
   (d) drying the sheet, thereby forming the modified cellulose.

4. A process for preparing modified cellulose comprising the steps of:
   (a) adding lysinato chromyl chloride to a wet pulp finish;
   (b) forming a sheet from the pulp stock furnish;
   (c) adding an epoxy resin emulsion to the sheet, said epoxy resin having a gram equivalent weight of epoxy from about 300 to about 1100; and
   (d) drying the sheet, thereby forming the modified final product.

5. A process for preparing modified cellulose sheet material comprising the steps of:
   (a) adding lysinato chromyl chloride to a paper sheet;
   (b) adding to the sheet an epoxy resin emulsion, said epoxy resin having a gram equivalent weight of epoxy from about 300 to about 1100; and
   (c) drying the sheet, thereby forming the final product.

6. A modified paper product having included therein in a reacted form with cellulose fibers an active hydrogen containing amino group Werner complex of the formula:

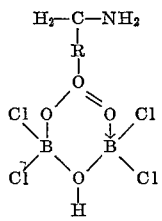

wherein R is selected from the class consisting of an alkylene radical from 2 to 8 carbon atoms, and a substituted alkylene radical of from 2 to 8 carbon atoms, and B is selected from the class consisting of Al and Cr, and an epoxy compound of the formula:

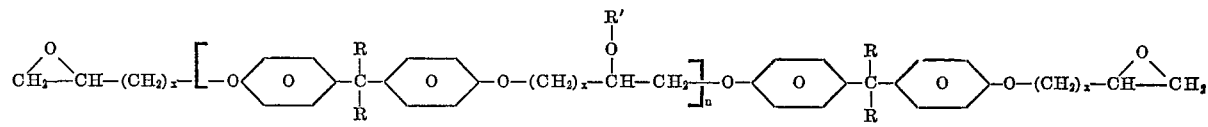

wherein $n$ represents the number of grams containing epoxy 1 gram equivalent of epoxide and is of from about 140 to about 4000, R is selected from the group consisting of alkyl radicals of from 1 to 5 carbon atoms and hydrogen, R' is selected from the group consisting of hydrogen and alkyl radicals of 1 to 5 carbon atoms, and $x$ is from 1 to 4.

7. A modified paper product having incorporated therein in a reacted form with cellulose fibers a lysinato chromyl chloride Werner complex, an epoxide compound of the formula:

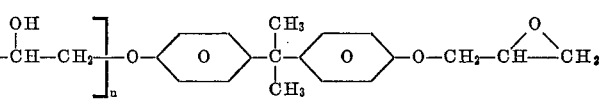

wherein $n$ represents the number of grams containing 1 gram equivalent of epoxide and is of from about 450 to about 525.

8. A modified paper product having included therein in a reacted form with cellulose fibers a Werner complex of the formula:

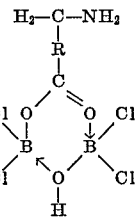

wherein R is selected from the class consisting of an alkylene radical from 2 to 8 carbon atoms, and a substituted alkylene radical of from 2 to 8 carbon atoms and B is selected from the class consisting of Al and Cr, and an epoxy compound of the formula:

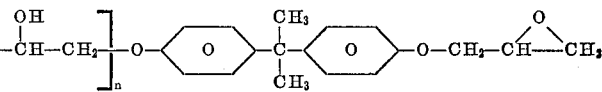

wherein $n$ represents the number of grams containing 1 gram equivalent of epoxy is of from about 140 to 4000.

9. A process for preparing a modified cellulose fiber product comprising the steps of: adding to a cellulose fiber sheet a solution containing a Werner complex having an active hydrogen, said Werner complex being selected from at least one member of the class consisting of aluminum Werner complexes and chromium Werner complexes of the formula:

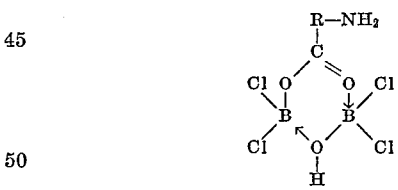

wherein R is selected from the class consisting of an alkylene radical of from 1 to 8 carbon atoms, substituted alkylene radical of from 1 to 8 carbon atoms, phenyl radical and substituted phenyl radical, and B is selected from the class consisting of Al and Cr; adding to the cellulose sheet an epoxy resin having a gram equivalent weight of epoxy of from about 140 to to about 4000; and drying the sheet, thereby forming the final product.

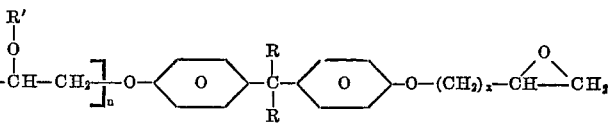

References Cited by the Examiner
UNITED STATES PATENTS

| | | | |
|---|---|---|---|
| 2,693,458 | 11/54 | Olson | 117—155 |
| 2,913,356 | 11/59 | Schroeder | 162—164 |
| 3,109,769 | 11/63 | Martin | 162—164 |

DONALL H. SYLVESTER, *Primary Examiner.*

MORRIS O. WOLK, *Examiner.*